UNITED STATES PATENT OFFICE.

G. A. JULIUS TIETZ, OF PHILADELPHIA, PENNSYLVANIA.

DECORATING GLASS.

SPECIFICATION forming part of Letters Patent No. 236,381, dated January 4, 1881.

Application filed November 2, 1880. (No specimens.)

*To all whom it may concern:*

Be it known that I, G. A. JULIUS TIETZ, a citizen of the United States, residing in Philadelphia, Pennsylvania, have invented an Improvement in Decorating Glass, of which the following is a specification.

My invention relates to certain improvements in the ornamentation of glass by etching, the objects of my improvements being to simplify and cheapen the process.

In carrying out my invention, I first take a flat sheet of glass of the proper size, and coat the surface of the same with a varnish which will resist the action of the etching-acid. I then, by means of a proper tool, remove certain parts of this protecting-coating in accordance with the character of the design determined upon; or, instead of this process, a design may be drawn upon the glass with resisting-varnish; or the design may be produced partly by drawing, as described, and partly by removing portions of the resisting-coating. The sheet of glass is then subjected to the action of the acid, when those portions which are not covered by the protecting-coating will be etched or removed to a certain depth, thus producing a sunken or intaglio design. The protecting-coating is then removed, and the etched sheet of glass used as a printing-surface for the production of any desired number of copies of the design, the printing being effected in the same manner as in printing from an ordinary steel or other engraved plate, and the ink used being such as will resist the action of an etching-acid. While the ink on the print is still moist, said print is applied to the surface which is to be decorated, which surface may be of plain, white, colored, or flashed glass, and either flat or round. The print adheres to the glass, and the article is then placed in a room or apartment within which a temperature as low as 40° or 45° Fahrenheit is maintained, and after being subjected to this temperature for a length of time varying with the extent and character of the design—say, on an average, twenty-four hours— the article is removed therefrom, when it will be found that the paper can be easily removed from the glass, the ink-impression, however, remaining firmly affixed to said glass. The article is then subjected to the bath of acid to produce the etched design, as in the ordinary way, the parts covered by the transferred print being protected, so that a design precisely similar to that originally produced by the artist is formed on any desired number of articles.

By the use of a sheet of glass and the production, by etching, of a design thereon, and then using said etched sheet of glass as a printing-surface to multiply copies of the original design, I considerably cheapen the process of decorating glass, the original sheet of glass being inexpensive, and the cost of producing a design thereon by etching being insignificant compared with the cost of engraving a plate or block of metal, stone, or wood in the usual way. Another advantage of using a sheet of glass as a printing-surface is, that the same can be etched very deeply, so that the thickness of the resisting-ink on the print produced therefrom will be sufficient to effectually resist the action of the acid, even in the finest lines of the design, and when the print is applied to a piece of flashed glass—that is to say, a plate of glass having a surface of glass of a different color—the action of the acid may be continued long enough to remove the colored glass from the exposed portions of the design without impairing the sharp or well-defined character of the pattern.

It has been a common practice heretofore to decorate glass by engraving a design on a metal plate or block of stone, printing copies of said design, transferring the copies onto the surface of the article to be decorated, and then subjecting the latter to the action of an etching-acid, such a process being described in the English Patent No. 1,714 of 1853; but it will be evident from the above description of my process that the latter is superior to the ordinary process, both as regards economy in the production of the original printing-surface and strength of the lines in the impression printed therefrom.

The use of a low degree of temperature as a means of fixing the printed design on the glass and freeing it from the paper is also advantageous on the score of economy and effectiveness, no careful manipulation or other treatment of the print being necessary in order to effect the easy removal of the same from the glass, and such removal being accomplished without any risk of impairing the integrity of the fine portions of the design.

I claim as my invention—

1. As an improvement in the art of decorating glass, the within-described process, consisting in first etching on a flat sheet of glass the desired design, printing copies of the design from said etched sheet of glass, transferring said copies to the articles to be decorated, and etching the latter, as set forth.

2. The mode herein described of fixing a print on glass and freeing the paper therefrom, said mode consisting in subjecting the glass, with the adhering print, to a low degree of temperature, as specified.

In testimony whereof I have signed my name to this specification in the presence of two subscribing witnesses.

G. A. JULIUS TIETZ.

Witnesses:
JAMES F. TOBIN,
HARRY SMITH.